Oct. 9, 1962  C. D. MONTGOMERY  3,057,219
DRIVE SPROCKET CONSTRUCTION
Filed June 5, 1961

INVENTOR.
CHARLES D. MONTGOMERY
BY S. J. Rotondi,
A. J. Dupont & N. J. Latker

3,057,219
DRIVE SPROCKET CONSTRUCTION
Charles D. Montgomery, Havre de Grace, Md., assignor to the United States of America as represented by the Secretary of the Army
Filed June 5, 1961, Ser. No. 115,047
7 Claims. (Cl. 74—243)
(Granted under Title 35, U.S. Code (1952), sec. 266)

The invention described herein may be manufactured and used by or for the Government for governmental purposes without the payment to me of any royalty thereon.

This invention relates to a cushioned drive sprocket for track-laying vehicles.

The engagement of the track shoe and the drive sprocket has long been recognized as one of the major sources of noise and vibration in track-laying vehicles. Prior art devices have minimized this undesirable noise and vibration in a number of ways, the most successful of which is the placing of an elastic torus-shaped cushion on the hub of the drive sprocket. This type of cushion is best illustrated by the U.S. patent to Downey, Patent No. 975,938. The Downey cushion absorbs the shock produced by the impact of the track shoe against the drive sprocket, but will always be compressed sufficiently to allow the track shoe to engage the drive teeth of the sprocket.

This method of damping is effective as long as the pitch of the track shoe, i.e., the transverse dimension, is small in relation to the outer circumference of the elastic cushion, but, as the pitch of the track shoe increases in relation to the circumference of the elastic cushion, some undesirable effects result due to the decrease in surface contact between the track shoe and the sprocket drive. In track-laying vehicles where the track shoe pitch is large in relation to the cushion circumference, the pressure of the shoe against the cushion is concentrated at a few points along the cushion's circumference, whereas, when the relationship of shoe pitch to cushion circumference is small, the pressure is spread out over a much greater area. A concentration of force at a few points would naturally wear the surface of the elastic cushion at a faster rate than would the same force spread out over a large area. Further, when the relationship of the track shoe pitch to elastic cushion circumference is large, there is a tendency for the track shoe to rotate about the point at which it contacts the elastic cushion and vary the point of engagement between the sprocket teeth and the shoe. This causes noise and uneven wear of the sprocket teeth with a corresponding decrease in tooth life.

In some military track-laying vehicles, track shoe pitches are made large in relation to cushion circumference in order to reduce the number of shoe connecting pins in a track, and to provide sufficient track shoe area for good footing and grouser attachments.

The object of this invention is to provide a novel elastic cushion on the drive sprocket of a track-laying vehicle that eliminates point contact and all the undesirable results that accompanies such contact when using a track shoe of large pitch in relation to the circumference of the elastic cushion.

More specifically, the object of this invention is to provide a novel elastic drive sprocket cushion whose outer perimeter is a polygon whose sides are substantially equal to the pitch of an associated track shoe and are adapted to engage the underside of the track shoe from connecting pin to connecting pin.

A further object of this invention is to provide an elastic polygonal drive sprocket cushion that engages and drives the track with no or little engagement between the drive teeth of the associated drive sprocket and the track shoes when the vehicle is moving easily but which cushion is compressed sufficiently to allow the track shoes moving around the sprocket to engage the drive teeth of the sprocket when the vehicle is starting up, turning, or traversing difficult terrain. This differs from prior art devices in that the drive teeth of the sprocket are not in constant engagement with the track shoes moving around the sprocket and thus provides an increase in the life of the drive teeth.

Further objects and advantages of the present invention will be apparent from the following description, reference being had to the accompanying drawing wherein preferred embodiments of the present invention are clearly shown.

Figure 1:
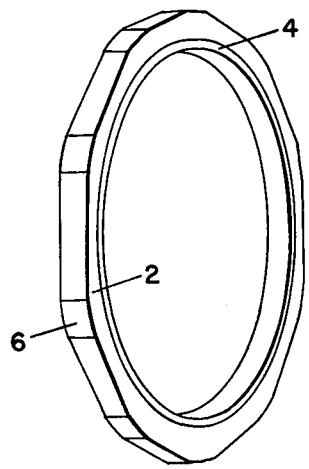
FIG. 1 is a perspective view of the novel polygonal sprocket cushion of this invention.

Referring specifically to the drawing, FIG. 1 illustrates the novel polygonal sprocket cushion 2. The polygonal cushion 2 is preferably made from rubber but may be made from any suitable elastic material. In order to add body and facilitate the handling of the elastic cushion 2, a nylon cord backing 4 may be adhesively secured to the inner periphery of the cushion 2. The length of the sides of the polygonal cushion 2 are made substantially equal to the pitch of the track shoes that will be moving around the drive sprocket. Further, the corners of the cushion 2 are beveled, as shown at 6, so as to provide room for the pivot joint 5 between adjacent track shoes 8 as best illustrated in FIG. 2.

Figure 2:
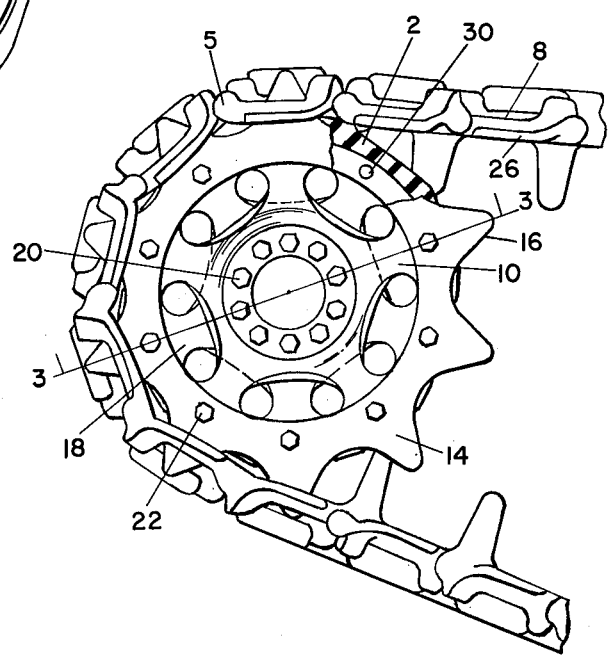
FIG. 2 is an elevational view, with parts being broken away, of the drive sprocket engaging and driving a vehicle track.
Figure 3:
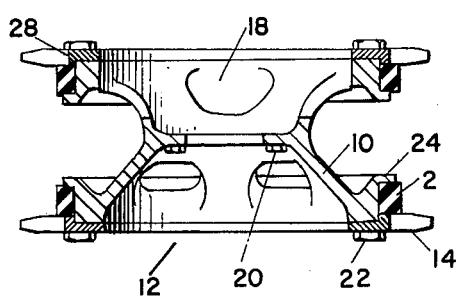
FIG. 3 is a sectional view taken along line 3—3 of FIG. 2, excluding the vehicle track.

FIGS. 2 and 3 of the drawing, illustrate two polygonal cushions 2 mounted on drive sprocket hub 10. The drive sprocket 12 is made up of five parts, two polygonal cushions 2, two sprocket disks 14 which carry drive sprocket teeth 16, and the drive sprocket hub. The hub 10 is provided with outlet holes 18 designed to reduce the possibility of dirt, wet sand, or snow packing. If desired, cushions 2 can be furnished with crowned contours which will further reduce the possibility of dirt, wet sand or snow packing. In FIG. 2, bolts 20 and 22 are shown attaching, respectively, hub 10 to the drive shaft of the vehicle (not shown) and sprocket disk 14 to hub 10.

When assembling the drive sprocket, cushions 2 are first slipped over hub 10 until they are contiguous to flanges 24 on hub 10. The cushions 2 are then rotated and indexed on the drive sprocket hub 10, so that lines drawn perpendicular to and bisecting the long sides of the polygon will coincide with the center lines of the sprocket disk drive teeth 16 when the sprocket disk 14 is fastened to hub 10. This positioning, as best illustrated in FIG. 2, insures that the underside of the track shoes 26 will engage the side of polygonal cushion to which each shoe 8 is associated throughout that side's full length, as the track moves around the drive sprocket. Thus, the shape of the cushion eliminates point contact and all the undesirable results that accompanies such contact while providing a firm base upon which the track shoe 8 will ride until it moves off the drive sprocket. The specific details of the track shoe construction are not described, since per se they are not considered part of the invention, and it is to be understood that this invention is not limited to use with a specific track shoe but is to be considered equally useful with shoes of many designs.

After properly mounting cushion 2 on hub 10, sprocket disk 14 is fixed to hub 10 by first inserting hub 10 into annular recess 28 and the fastening bolts 22 in mating bolt holes 30. The width of cushions 2 are made larger than the spaces provided between flanges 24 and disks 14 when in engagement so that when sprocket disks 14 are fastened to hub 10, cushions 2 will be tightly compressed between flanges 24 and disks 14. This insures that there will be no relative movement between cushions 2 and hub 10 when the drive sprocket is in operation.

The drive sprocket can be dissassembled by merely reversing the assembly procedure described above. The ability to disassemble the combination enables the replacement of a worn sprocket disk or cushion without the necessity of replacing the entire assembly.

As discussed above, a further object of this invention is to provide an elastic polygonal sprocket cushion that engages and drives the track with no or little engagement between the drive teeth 16 of the sprocket and the track shoes 8, when the vehicle is moving easily but which cushion is compressed sufficiently to allow the track shoes moving around the sprocket to engage the drive teeth of the sprocket when the vehicle is starting up, turning, or traversing difficult terrain. This is accomplished by making the cushion 2 of such size in relation to sprocket disk 14 that the radial compression of cushion 2 while the vehicle is moving easily is not enough to bring the drive teeth into engagement with track shoe 8, but, as the going becomes more difficult and the tension on the track becomes greater, the cushion is compressed to the point where there is engagement between the drive teeth 16 and track shoes 8. Thus, the polygonal cushions 2 are driving the tracks when the vehicle is moving easily, and there is little tension on the track, and the drive teeth 16 are driving when the going becomes difficult and the tension on the track is large. This necessarily distributes the wear that would ordinarily occur only on the drive teeth to both the drive teeth 16 and the polygonal cushions 2 and increases the life of the drive teeth.

It is understood that various modifications may be apparent to those skilled in the art without departing from the spirit and scope of the invention, and the invention is not to be limited to the illustrated embodiments except as included in the appending claims.

I claim:

1. A drive sprocket of the character described adapted to engage and drive the track of a track-laying vehicle, said drive sprocket comprising first and second means adapted to drive said track, said first means having a plurality of angularly related track engaging sides, said sides being disposed so that any two adjacent sides form an outwardly pointing angle said first means being elastic and so designed and so disposed to drive said track when under predetermined load conditions, said first and second means adapted to engage and cooperatively drive said track when the load conditions thereof are greater than the first mentioned load conditions.

2. The drive sprocket of claim 1, wherein said sides are positioned in relation to said second means so as to be adapted to engage throughout their length the underside of shoes of said track as the latter moves over said drive sprocket.

3. The drive sprocket of claim 2, wherein said sides of said elastic means are each substantially equal in length to the pitch of said track shoes.

4. The drive sprocket of claim 3, wherein said second means comprises a hub adapted to be mounted on and rotatable with the drive shaft of said track-laying vehicle and a sprocket disc removably attached to said hub, said sprocket disc provided with drive teeth adapted for driving engagement with said track, said hub provided with an annular flange, said elastic means mounted on said hub and contiguous to said annular flange, said sprocket disc and said annular flange being so designed and disposed as to tightly engage said elastic means therebetween.

5. A drive sprocket of the character described adapted to engage and drive the track of a track-laying vehicle, said drive sprocket comprising, a hub adapted to be mounted on and rotatable with the drive shaft of a track-laying vehicle, convex polygonal elastic means mounted on said hub for driving said track, said elastic means being adapted to contact the interior surface of said track under all track load conditions, and a sprocket disc removably attached to said hub, said sprocket disc provided with drive teeth adapted to drive said track, said hub provided with an annular flange contiguous to said elastic means, said annular flange and sprocket disc being so designed and disposed as to tightly engage said elastic means therebetween.

6. The drive sprocket of claim 5 wherein said elastic means is a cushion whose sides are positioned in relation to said drive teeth so as to be adapted to engage throughout their length, the underside of shoes of said track as the latter moves over said drive sprocket.

7. The drive sprocket of claim 5 wherein said sides of said elastic means are each substantially equal in length to the pitch of said track shoes.

References Cited in the file of this patent

UNITED STATES PATENTS 2,893,787    Nodwell _____ July 7, 1959